United States Patent
Fujita

(10) Patent No.: US 9,647,793 B2
(45) Date of Patent: May 9, 2017

(54) MEASURING DEVICE, MEASUREMENT METHOD, AND TRANSMISSION SYSTEM

(71) Applicant: FUJITSU LIMITED, Kawasaki-shi, Kanagawa (JP)

(72) Inventor: Takehiro Fujita, Yokohama (JP)

(73) Assignee: FUJITSU LIMITED, Kawasaki (JP)

(*) Notice: Subject to any disclaimer, the term of this patent is extended or adjusted under 35 U.S.C. 154(b) by 197 days.

(21) Appl. No.: 14/694,223

(22) Filed: Apr. 23, 2015

(65) Prior Publication Data
US 2015/0333863 A1    Nov. 19, 2015

(30) Foreign Application Priority Data

May 15, 2014 (JP) .................. 2014-101831

(51) Int. Cl.
| | | |
|---|---|---|
| H04B 10/00 | (2013.01) | |
| H04J 14/02 | (2006.01) | |
| H04B 10/079 | (2013.01) | |
| H04B 10/50 | (2013.01) | |
| H04B 10/564 | (2013.01) | |
| H04J 14/00 | (2006.01) | |

(52) U.S. Cl.
CPC .... *H04J 14/0256* (2013.01); *H04B 10/07955* (2013.01); *H04B 10/506* (2013.01); *H04B 10/564* (2013.01); *H04J 14/0221* (2013.01); *H04J 14/0227* (2013.01)

(58) Field of Classification Search
CPC .............. H04B 10/07955; H04B 10/07957
See application file for complete search history.

(56) References Cited

U.S. PATENT DOCUMENTS

2013/0251365 A1* 9/2013 Sone ............... H04B 10/07955
                                                         398/38

FOREIGN PATENT DOCUMENTS

| JP | 2012-175417 | 9/2012 |
| JP | 2013-201495 | 10/2013 |

* cited by examiner

*Primary Examiner* — Daniel Dobson
(74) *Attorney, Agent, or Firm* — Staas & Halsey LLP

(57) ABSTRACT

A measuring device includes an identifying unit configured to identify a design value of a central frequency of spectrum of an optical signal for each of sub-channels, the optical signal being formed in Nyquist pulse, the sub-channels forming a super-channel in wavelength division multiplexing communication; and a measurer configured to measure the power of the optical signal in a band for each of the sub-channels, the identified design value of the central frequency of the band being a central frequency of the band, the band being narrower than a frequency band of a corresponding one of the sub-channels.

6 Claims, 9 Drawing Sheets

| CHANNEL TYPE | NUMBER OF SUB-CHANNELS | FREQUENCY OFFSET VALUE (GHz) | | | | |
|---|---|---|---|---|---|---|
| | | #1 | #2 | #3 | #4 | ... |
| 100G-A | 1 | 0 | - | - | - | ... |
| 400G-A | 2 | -38 | +38 | - | - | ... |
| 400G-B | 4 | -108 | -36 | +36 | +108 | ... |
| ⋮ | ⋮ | ⋮ | ⋮ | ⋮ | ⋮ | ⋱ |

| DEVICE ID | DEVICE INFORMATION | OCM_ID | OCM INFORMATION |
|---|---|---|---|
| E001 | **** | M001 | **** |
| E002 | **** | M002 | **** |
| E003 | **** | M003 | **** |
| ⋮ | ⋮ | ⋮ | ⋮ |

MEASURING DEVICE, MEASUREMENT METHOD, AND TRANSMISSION SYSTEM

CROSS-REFERENCE TO RELATED APPLICATION

This application is based upon and claims the benefit of priority of the prior Japanese Patent Application No. 2014-101831, filed on May 15, 2014, the entire contents of which are incorporated herein by reference.

FIELD

The embodiments discussed herein are related to a measuring device, a measurement method, and a transmission system.

BACKGROUND

In wavelength multiplexing communication, communication rates are requested to be increased with increases in communication traffic. As a method for increasing the communication rates, there is a method for improving the efficiency of use of frequencies in optical bands. For example, in Orthogonal Frequency Division Multiplexing (OFDM) and Nyquist-Wavelength Division Multiplexing (Nyquist-WDM), multiple channels may be allocated in a narrower frequency band than conventional techniques, and the efficiency of use of frequencies may be improved.

A transmission system is considered, which achieves a communication rate of 100 Gbps or higher by applying a super-channel method for multiplexing optical signals of multiple sub-channels using OFDM, Nyquist-WDM, or the like and transmitting the multiple optical signals as a single optical signal.

Examples of related art are Japanese Laid-open Patent Publications Nos. 2012-175417 and 2013-201495.

SUMMARY

According to an aspect of the invention, a measuring device includes an identifying unit configured to identify a design value of a central frequency of spectrum of an optical signal for each of sub-channels, the optical signal being formed in Nyquist pulse, the sub-channels forming a super-channel in wavelength division multiplexing communication, and a measurer configured to measure the power of the optical signal in a band for each of the sub-channels, the identified design value of the central frequency of the band being a central frequency of the band, the band being narrower than a frequency band of a corresponding one of the sub-channels.

The object and advantages of the invention will be realized and attained by means of the elements and combinations particularly pointed out in the claims.

It is to be understood that both the foregoing general description and the following detailed description are exemplary and explanatory and are not restrictive of the invention, as claimed.

DESCRIPTION OF EMBODIMENTS

Figure 1:
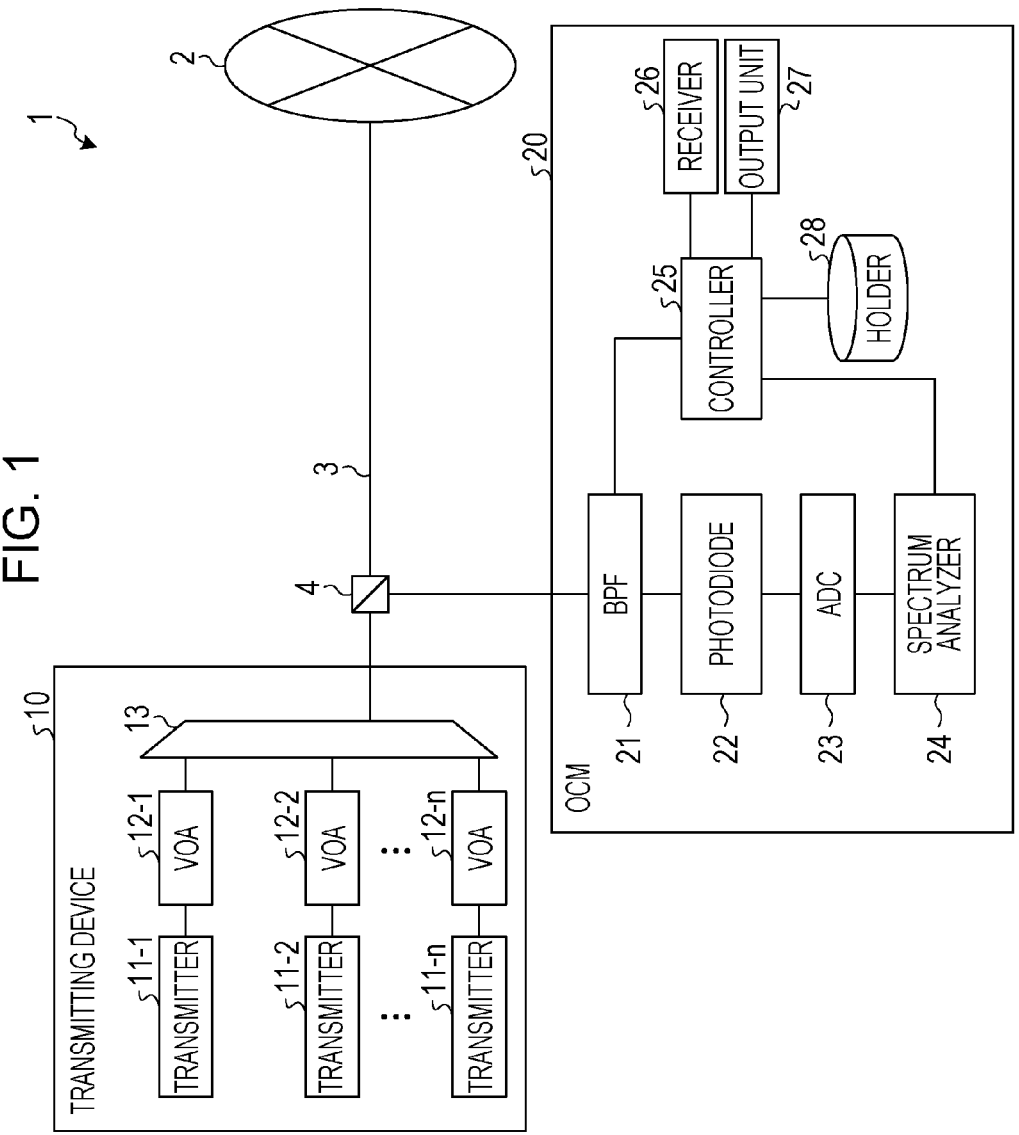
FIG. 1 is a diagram illustrating an example of a transmission system according to a first embodiment.

The frequencies of optical signals vary depending on characteristics of light emitting elements provided in a device as a source for transmitting the optical signals. Thus, the central frequencies of the optical signals of sub-channels transmitted by the source device may be shifted from the central frequencies of the sub-channels defined in a specification due to a change in an environment of the device, a change of the device with time, or the like. However, even in this case, each of frequencies at which the strength of frequency spectra of the optical signals is locally at peaks may be estimated as a central frequency of the respective sub-channels, and the strength of the optical signals of the sub-channels may be measured. In addition, detecting, as boundaries between the sub-channels, frequencies causing the strength of the frequency spectra of the optical signals to be at the lowest levels gives an estimated central frequency as the center of the detected boundaries, and the strength of the optical signals of the sub-channels may be measured.

However, when multiple sub-channels are allocated in a narrower frequency band than those of the conventional techniques in order to improve the efficiency of use of the frequencies, intervals between the sub-channels are reduced and the width of the low level strength between the frequency spectra of the optical signals of the neighboring sub-channels become narrower. Thus, resolutions of conventional power measuring devices may be insufficient to detect the boundaries between the sub-channels and accordingly the resolutions are not good to accurately measure the strength of the optical signals of the sub-channels.

In Nyquist-WDM, optical signals are formed into Nyquist pulses, and envelopes of frequency spectra are rectangular shapes. Thus, frequencies at which the strength of the frequency spectra of the optical signals is locally at peaks may not close to the central frequencies of the sub-channels, and the central frequencies of the sub-channels may not be estimated from the local peaks. Thus, when Nyquist-WDM is used, the conventional power measuring devices do not accurately measure the strength of the optical signals of the sub-channels.

Thus, whether or not optical signals are output for the sub-channels may not be determined correctly, and when the quality of transmission in an overall super-channel is low, an abnormal sub-channel may not be identified.

Accordingly, it is desired to detect an abnormality of transmission power for each of sub-channels forming super-channels in wavelength division multiplexing communication.

Hereinafter, a measuring device, a measurement method, and a transmission system that are disclosed herein are described in detail based on the accompanying drawings. The following first and second embodiments do not limit the techniques disclosed herein. The embodiments may be combined without contradiction of details of processes.

First Embodiment

Configuration of Transmission System 1

FIG. 1 is a diagram illustrating an example of a transmission system 1 according to the first embodiment. The transmission system 1 according to the first embodiment includes a transmitting device 10 and an optical channel monitor (OCM) 20. The transmitting device 10 is coupled to an optical communication network 2 through a transmission path 3 such as an optical fiber cable. The OCM 20 is coupled to a coupler 4, while the coupler 4 is installed on the transmission path 3 between the transmitting device 10 and the optical communication network 2.

The transmitting device 10 includes a plurality of transmitters 11-1 to 11-$n$, a plurality of variable optical attenuators (VOAs) 12-1 to 12-$n$, and a multiplexer 13. Hereinafter, when the transmitters 11-1 to 11-$n$ are not distinguished from each other, the transmitters 11-1 to 11-$n$ are collectively referred to as transmitters 11. When the VOAs 12-1 to 12-$n$ are not distinguished from each other, the VOAs 12-1 to 12-$n$ are collectively referred to as VOAs 12.

The transmitters 11 output optical signals that are different from each other depending on data to be transmitted. The transmitters 11 form the waveforms of the optical signals into Nyquist pulses with a roll off factor $\alpha$ of 0.5 or less and output the optical signals to the VOAs 12. The VOAs 12 adjust the amounts of attenuation of the power of the optical signals output from the transmitters 11 and thereby adjust the power of the optical signals output from the transmitters 11 to predetermined power. The multiplexer 13 multiplexes the optical signals having wavelengths and the power adjusted by the VOAs 12 and outputs the optical signals to the optical communication network 2 through the transmission path 3.

Figure 2:
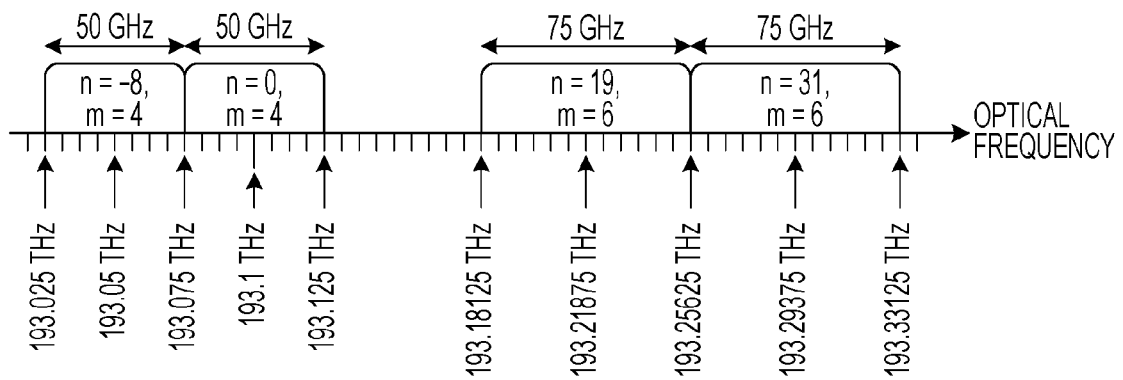
FIG. 2 is an explanatory diagram illustrating an example of frequency slots.

A channel configuration for the optical signals transmitted by the transmitting device 10 is described below. FIG. 2 is an explanatory diagram illustrating an example of frequency slots defined by ITU-T G.694.1. ITU-T G.694.1 defines the frequency slots based on central frequencies and slot widths. The central frequencies $f_0$ of the frequency slots are allocated to frequencies of 6.25 GHz×n (n is an integer), as expressed by the following Equation (1), while a frequency of 193.1 THZ is used as a standard.

$$f_0 = 193.1 + n \times 0.00625 \quad (1)$$

In addition, the slot widths W of the frequency slots are defined as slot widths of 12.5 GHz×m (m is a natural number).

$$W = 12.5 \times m \quad (2)$$

Any combination of frequency slots may be accepted as long as the frequency slots do not overlap each other. The frequency slots each are represented by a combination of m and n, as illustrated in FIG. 2, for example. For example, a combination of m of 19 and n of 6 represents a frequency slot of which the central frequency is 193.21875 THz and the bandwidth is 75 GHz, as illustrated in FIG. 2.

Figure 3:
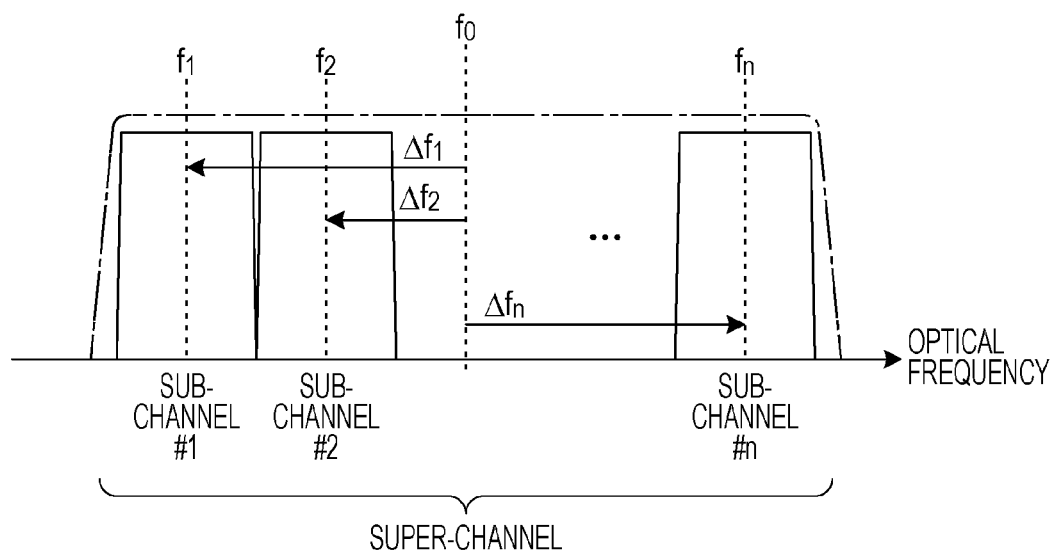
FIG. 3 is an explanatory diagram illustrating an example of a configuration of a super-channel.

FIG. 3 is an explanatory diagram illustrating an example of a configuration of a super-channel. Super-channels are set to frequency slots, respectively, as illustrated in FIG. 3, for example. The super-channels each include one or more sub-channels #1 to #n. In the present embodiment, the central frequency of a super-channel is defined as $f_0$, and the central frequencies of sub-channels included in the super-channel are defined as $f_1, f_2, \ldots, f_n$. In addition, offsets of the central frequencies $f_1, f_2, \ldots, f_n$ of the sub-channels from the central frequency $f_0$ of the super-channel are defined as $\Delta f_1, \Delta f_2, \ldots, \Delta f_n$.

In the present embodiment, the waveforms of the optical signals transmitted by the transmitting device 10 are formed into the Nyquist pulses with the roll off factor $\alpha$ of 0.5 or less. Thus, the outer shapes of frequency spectra of the sub-channels included in the super-channel are substantially rectangular shapes with flat upper portions.

Return to FIG. 1. The OCM 20 includes a band pass filter (BPF) 21, a photodiode 22, an analog-to-digital converter (ADC) 23, a spectrum analyzer 24, a controller 25, a receiver 26, an output unit 27, and a holder 28. The OCM 20 is an example of the measuring device. The spectrum analyzer 24 is an example of a measurer. The controller 25 is an example of an identifying unit.

Figures 4, 5:
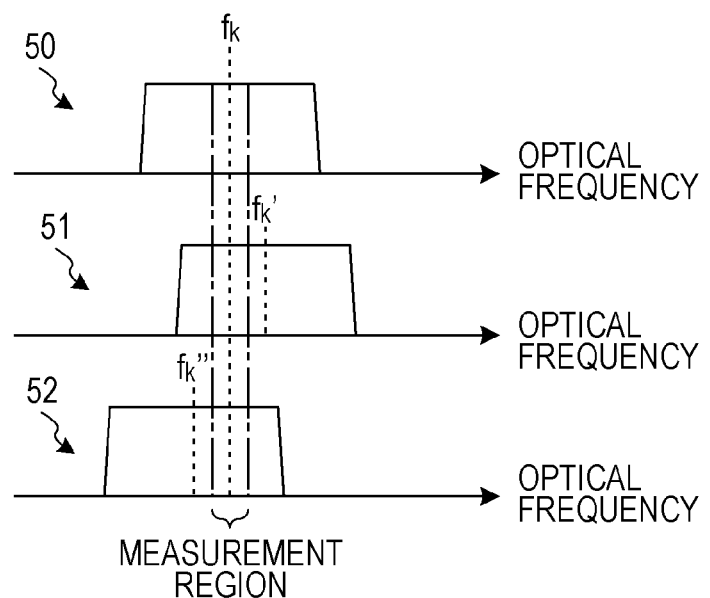
FIG. 4 is a diagram illustrating an example of a channel table.
FIG. 5 is an explanatory diagram describing effects of variations in frequencies.

The holder 28 includes a channel table 280. FIG. 4 is a diagram illustrating an example of the channel table 280. The number of sub-channels 282 included in the super-channel, the frequency-offset value 283 are associated with a channel type 281 which identify the type of the super-channel type and stored in the channel table 280.

For example, as illustrated in FIG. 4, a super-channel of which a channel type 281 is "400G-A" includes two sub-channels. In addition, an offset value of the central frequency $f_1$ of a sub-channel #1 from the central frequency $f_0$ of the super-channel is −38 (GHz), for example. In addition, an offset value of the central frequency $f_2$ of a sub-channel #2 from the central frequency $f_0$ of the super-channel is +38 (GHz), for example. The controller 25 may quickly identify design values of the central frequencies of the sub-channels by referencing the channel table 280.

The BPF 21 is a wavelength variable filter which causes an optical signal by configured to cause an optical signal of a predetermined frequency band having a specified center frequency to pass through the BPF 21. The BPF 21 receives the optical signals output by the transmitting device 10 through the transmission path 3 and transfers, to the photodiode 22, an optical signal that is among the received optical signals and is in the predetermined frequency band having the center frequency specified by the controller 25. The bandwidth of the passband of the BPF 21 is narrower than bandwidths of the sub-channels. It is preferable that the bandwidth of the passband of the BPF 21 be equal to or wider than ⅙ of the bandwidths of the sub-channels and equal to or narrower than ⅓ of the bandwidths of the sub-channels. In the present embodiment, the bandwidth of the passband of the BPF 21 is 6 GHz, for example.

The photodiode 22 receives the optical signal that has passed through the BPF 21. Then, the photodiode 22 outputs a voltage corresponding to the power of the received optical signal to the ADC 23. The ADC 23 converts the voltage output from the photodiode 22 into a digital value corresponding to the output voltage and outputs the converted digital value to the spectrum analyzer 24. The spectrum analyzer 24 analyzes, based on the digital value output from the ADC 23, a frequency spectrum of the optical signal that has passed through the BPF 21. Then, the spectrum analyzer 24 calculates the power of the optical signal that has passed through the BPF 21. The spectrum analyzer 24 transmits information of the calculated power of the optical signal to the controller 25.

The receiver 26 receives a value n identifying the central frequency of the super-channel and information for the channel type of the super-channel from a user of the OCM 20. Then, the receiver 26 transmits the received value n and the received information for the channel type to the controller 25. The receiver 26 may receive the value n and the information for the channel type through a communication line from another device such as a general-purpose computer operated by a user.

When receiving the value n and the information for the channel type from the receiver 26, the controller 25 applies the received value n to the aforementioned Equation (1) and calculates a design value of the central frequency $f_0$ of the super-channel.

Next, the controller 25 references the channel table 280 within the holder 28 and identifies the number, associated with the received channel type, of the sub-channels. Then, the controller 25 extracts, from the channel table 280, offset values for the identified number of the sub-channels. Then, the controller 25 calculates each of design values of the central frequencies $f_1$ to $f_n$ of the sub-channels included in the super-channel. Then, the controller 25 transmits the calculated design values, as specified frequencies, of the central frequencies $f_1$ to $f_n$ of the sub-channels to the BPF 21.

Next, the controller 25 receives, from the spectrum analyzer 24, measured values of the power of the optical signals of the sub-channels. Then, the controller 25 determines, based on the received measured values, whether or not there exists a sub-channel that outputs power that is higher or lower than an allowable range. The controller 25 determines whether or not the power measured for the sub-channels satisfies the following Inequality (3).

$$\Delta P_{th(Low)} \leq P(i) - P_{ave} \leq \Delta P_{th(High)} \quad (3)$$

In Inequality (3), P(i) represents the power of an i-th sub-channel which is calculated by the spectrum analyzer 24. $\Delta P_{th(Low)}$ is a lower limit of the allowable range and is, for example, −3 dB. In addition, $\Delta P_{th(High)}$ is an upper limit on the allowable range and is, for example, +3 dB. In addition, Pave is an average value of the power measured for all the sub-channels included in the super-channel and is calculated using the following Equation (4), for example.

$$P_{ave} = 10\log\left(\frac{1}{N}\Sigma_{i=1}^{N} 10^{P(i)/10}\right) \quad (4)$$

When there exists a piece of power among pieces of the power measured for the sub-channels does not satisfies the aforementioned Inequality (3), the controller 25 transmits, to the output unit 27, identification information, such as a channel number or the like, of a sub-channel of which the power does not satisfies Inequality (3).

The output unit 27 outputs the identification information, received from the controller 25, of the sub-channel to an output device such as a display. The output unit 27 may transmit the channel number received from the controller 25 to another device through a communication line.

The frequencies of the optical signals output from the transmitting device 10 depend on characteristics of light emitting elements included in the transmitters 11. Thus, the central frequencies of the sub-channels may be shifted from the design values due to increases in temperature, changes with time, or the like. FIG. 5 is an explanatory diagram describing effects of variations in frequencies.

For example, even when a design central frequency of a sub-channel is $f_k$, as indicated by reference numeral 50 in FIG. 5, the central frequency of the sub-channel may be shifted from $f_k$ to $f_k'$ or $f_k''$ due to a characteristic of a light emitting element included in a transmitter 11, as indicated by reference numerals 51 and 52.

Since the waveforms of the optical signals transmitted by the transmitting device 10 are formed into the Nyquist pulses with the roll off factor of 0.5 or less, the outer shapes of the frequency spectra of the sub-channels are the substantially rectangular shapes with the flat upper portions. Thus, when the passband of the BPF 21 is in a range of the flat upper portions of the frequency spectra of the sub-channels, the spectrum analyzer 24 may obtain measurement results that are the same as or close to those measured at the central frequencies of the sub-channels in the case that the central frequencies of the sub-channels are slightly shifted In the present embodiment, the bandwidth of the passband of the BPF 21 is narrower than the bandwidths of the sub-channels. In addition, it is preferable that the bandwidth of the passband of the BPF 21 be equal to or wider than ⅙ of the bandwidths of the sub-channels and equal to or narrower than ⅕ of the bandwidths of the sub-channels. Thus, even when the central frequencies of the sub-channels are slightly shifted due to the characteristics of the light emitting elements, the spectrum analyzer 24 may obtain measurement results that are the same as or close to those measured at the central frequencies of the sub-channels.

In the present embodiment, however, the bandwidth of the passband of the BPF 21 is narrower than the bandwidths of the sub-channels, for example, the bandwidth of the passband the BPF 21 is 6 GHz and the bandwidth of the sub-channels are 32 GHz. Further, the BPF 21 does not scan the passband for a single sub-channel. Thus, the power P(i) calculated by the spectrum analyzer 24 for the sub-channels is lower than actually output power of each of the sub-channels.

However, since the controller 25 measures under the same conditions the power for each of the sub-channels included in the super-channel, the controller 25 may calculate relative relationships of the power between the sub-channels. Thus, the controller 25 may detect, based on the power calculated by the spectrum analyzer 24 for each of the sub-channels, an abnormal sub-channel that outputs power that is higher or lower than the allowable range.

Operation of OCM 20

Figure 6:
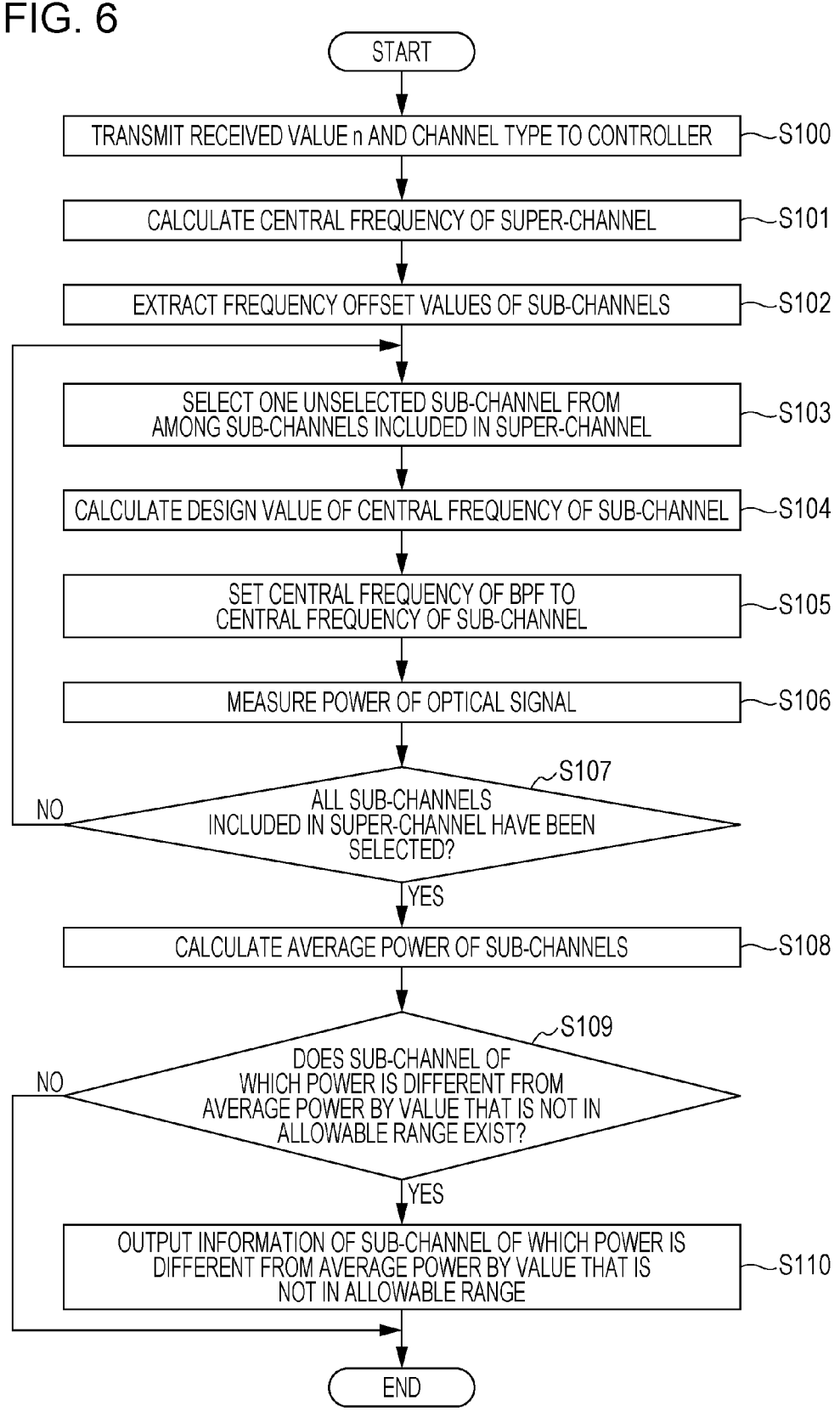
FIG. 6 is a flowchart of an example of an operation of an OCM according to the first embodiment.

FIG. 6 is a flowchart of an example of an operation of the OCM 20 according to the first embodiment. For example, when the receiver 26 receives, from the user of the OCM 20, the value n identifying the central frequency of the super-channel and the channel type of the super-channel, the OCM 20 starts an operation depicted in the flowchart.

First, the receiver 26 transmits the received value n and the received channel type to the controller 25 (in S100). The controller 25 applies the value n received from the receiver 26 to the aforementioned Equation (1) and calculates the design value of the central frequency of the super-channel (in S101).

Next, the controller 25 references the channel table 280 within the holder 28 and identifies the number of the sub-channels which is associated with the channel type received from the receiver 26. Then, the controller 25 extracts offset values for the identified number of the sub-channels from the channel table 280 (in S102).

Next, the controller 25 selects one unselected sub-channel among the sub-channels included in the super-channel (in S103). Then, the controller 25 shifts the central frequency $f_0$, calculated in Step 101, of the super-channel including the selected sub-channel by a frequency corresponding to an offset value for the selected sub-channel extracted in step S102 and calculates a design value of the central frequency of the selected sub-channel (in S104). Then, the controller 25 transmits, as a specified frequency, the calculated design value of the central frequency of the sub-channel to the BPF 21. The BPF 21 sets the frequency specified by the controller 25 to the central frequency of the passband (in S105).

The photodiode 22 outputs, to the ADC 23, a voltage corresponding to the power of an optical signal that has passed through the BPF 21. The ADC 23 converts the voltage output from the photodiode 22 into a digital value and outputs the converted digital value to the spectrum analyzer 24. The spectrum analyzer 24 analyzes, based on the digital value output from the ADC 23, the frequency spectrum of the optical signal that has passed through the BPF 21, and the spectrum analyzer 24 measures the power of the optical signal that has passed through the BPF 21 (in S106). Then, the spectrum analyzer 24 transmits the measured power value of the optical signal to the controller 25.

Next, the controller 25 determines whether or not all the sub-channels included in the super-channel have been selected (in S107). When an unselected sub-channel exists (No in S107), the controller 25 returns the process to step S103 and executes the processes of step S103 and the subsequent steps.

On the other hand, when all the sub-channels included in the super-channel have been selected, the controller 25 uses the aforementioned Equation (4) to calculate the average power of the sub-channels included in the super-channel (in S108).

Next, the controller 25 calculates a power difference between the calculated average power and the measured power of each of the sub-channels. Then, the controller 25 determines whether or not a sub-channel of which the measured power is different from the average power by a value that is not in the allowable range exists or whether or not a sub-channel that does not satisfy the aforementioned Inequality (3) exists (in S109). When the sub-channel that does not satisfy the aforementioned Inequality (3) exists (Yes in S109), the controller 25 transmits, to the output unit 27, identification information of the sub-channel that does not satisfy the aforementioned Inequality (3), where example of the identification information is a channel number or the like. The output unit 27 outputs the identification information, received from the controller 25, of the sub-channel to the output device such as a display (in S110), and the OCM 20 terminates the operation depicted in the flowchart.

On the other hand, when the power of all the sub-channels included in the super-channel satisfies Inequality (3) (No in S109), the OCM 20 terminates the operation depicted in the flowchart. When the power of all the sub-channels included in the super-channel satisfies Inequality (3) (No in S109), the controller 25 may transmit information indicating no abnormality to the output unit 27, and the output unit 27 may output the information indicating no abnormality to the output device such as a display.

Effect of First Embodiment

As described above, the OCM 20 according to the present embodiment may detect whether or not transmission power is abnormal for each of the sub-channels forming the super-channels in wavelength division multiplexing communication.

Second Embodiment

Configuration of Transmission System 1

Figure 7:
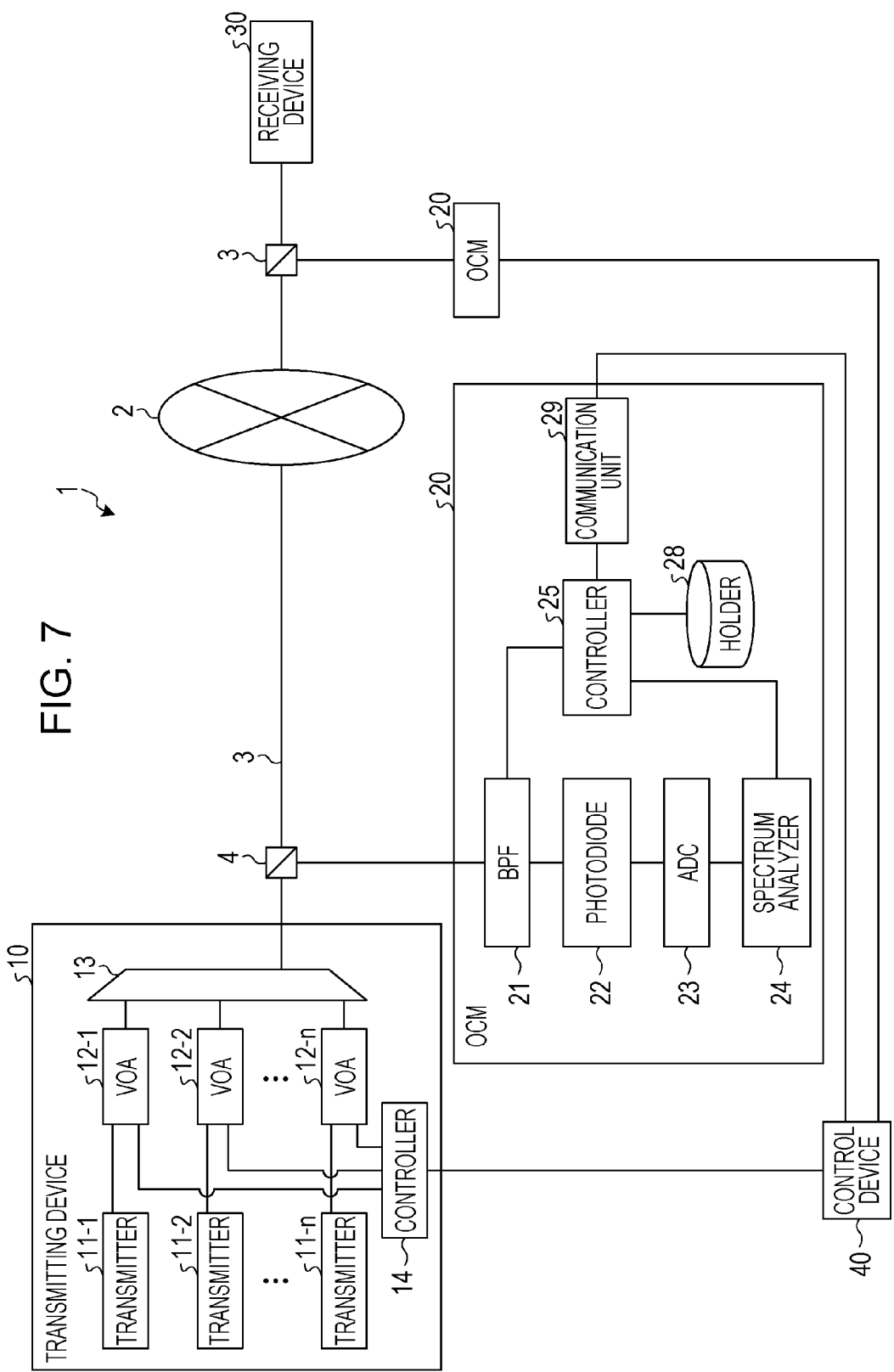
FIG. 7 is a diagram illustrating an example of the transmission system according to a second embodiment.

FIG. 7 is a diagram illustrating an example of the transmission system 1 according to a second embodiment. The transmission system 1 according to the second embodiment includes a transmitting device 10, a plurality of OCMs 20, a receiving device 30, and a control device 40. The receiving device 30 is coupled to the optical communication network 2 through the transmission path 3 such as an optical fiber cable and configured to receive an optical signal from the transmitting device 10. In FIG. 7, configurations that are represented by the same reference numbers and symbols as FIG. 1 have functions that are the same as or similar to the configurations described with reference to FIG. 1, except as described below, and a description thereof is omitted.

The transmitting device 10 includes the plurality of the transmitters 11-1 to 11-n, the plurality of VOAs 12-1 to 12-n, the multiplexer 13, and a controller 14. The VOAs 12 control the amounts of attenuation of the power of optical signals output from the transmitters 11 based on adjustment values received from the controller 14. When receiving the adjustment values to be used to adjust the amounts of the attenuation of the power of the optical signals of the sub-channels from the control device 40, the controller 14 transmits the received adjustment values to the VOAs 12 configured to control the amounts of the attenuation of the power of the optical signals of the sub-channels.

The OCMs 20 each include the BPF 21, the photodiode 22, the ADC 23, the spectrum analyzer 24, the controller 25, the holder 28, and the communication unit 29. When receiving information of the value n and information of the channel type from the control device 40 through a communication line, the communication unit 29 transmits the received value n and the received information of the channel type to the controller 25. In addition, when receiving information of the power of each of the sub-channels, the communication unit 29 transmits the received information of the power to the control device 40 through the communication line.

The control device 40 receives the information of the power of each of the sub-channels from the OCMs 20. Then, the control device 40 calculates an adjustment value for the amount of the attenuation to be set to each of the sub-channels based on the received information of the power of each of the sub-channels. Then, the control device 40 transmits the adjustment values calculated for the sub-channels to the transmitting device 10 through a communication line.

Configuration of Control Device 40

Figures 8, 9:
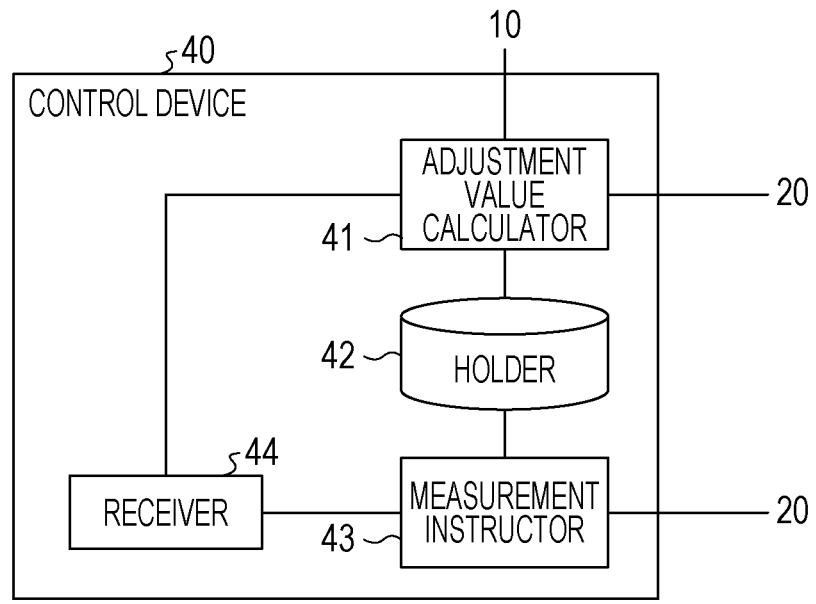
FIG. 8 is a block diagram illustrating an example of a control device.
FIG. 9 is a diagram illustrating an example of a device information table.

FIG. 8 is a block diagram illustrating an example of the control device 40. The control device 40 includes an adjustment value calculator 41, a holder 42, a measurement instructor 43, and a receiver 44.

The holder 42 includes a device information table 420. FIG. 9 is a diagram illustrating an example of the device information table 420. As illustrated in FIG. 9, in the device information table 420, device 30. The device information 422 is information on the transmitting device 10 or receiving device 30 that corresponds to the device ID 421. The device information 422 includes information that is used for communication with the transmitting device 10 or receiving device 30 that corresponds to the device ID 421. The device information 422 is, for example, an IP address, a MAC address, and the like.

The OCM_ID 423 is information identifying an OCM 20 able to measure an optical signal transmitted by the transmitting device 10 or to be received by the receiving device 30, while the transmitting device 10 or the receiving device 30 corresponds to the device ID 421. The OCM information 424 is information on the OCM 20 corresponding to the OCM_ID 423 and includes information that is used for communication with the OCM 20. The OCM information 424 is, for example, an IP address, a MAC address, and the like.

The receiver 44 receives the value n identifying the central frequency of the super-channel, the channel type of the super-channel, the device ID of the transmitting device 10, and the device ID of the receiving device 30 from a user of the control device 40. Then, the receiver 44 transmits the received value n, the received channel type, the received device ID of the transmitting device 10, and the received device ID of the receiving device 30 to the adjustment value calculator 41 and the measurement instructor 43. The receiver 44 may receive the value n, the channel type, the device ID of the transmitting device 10, and the device ID of the receiving device 30 from another device such as a general-purpose computer operated by a user through a communication line.

When receiving the value n, the channel type, the device ID of the transmitting device 10, and the device ID of the receiving device 30 from the receiver 44, the measurement instructor 43 references the device information table 420 within the holder 42 and extracts OCM information associated with the received device IDs. Then, the measurement instructor 43 transmits the value n and the channel type received from the receiver 44 to OCMs 20 corresponding to the extracted OCM information through a communication line and thereby instructs the OCM 20 to measure the power of optical signal of each of the sub-channels.

When receiving the value n, the channel type, the device ID of the transmitting device 10, and the device ID of the receiving device 30 from the receiver 44, the adjustment value calculator 41 references the device information table 420 within the holder 42. Then, the adjustment value calculator 41 extracts, from the device information table 420, device information and the OCM information that are associated with the received device IDs. Then, when receiving information of the power of each of the sub-channels from an OCM 20 associated with the device ID of the transmitting device 10, the measurement instructor 43 holds the received information of the power as Padd(i). Padd(i) represents the power of an optical signal of an i-th sub-channel transmitted by the transmitting device 10.

In addition, when receiving the information of the power of the sub-channels from an OCM 20 associated with the device ID of the receiving device 30, the measurement instructor 43 holds the received information of the power as Pdrop(i). Pdrop(i) represents the power of an optical signal of the i-th sub-channel received by the receiving device 30.

Then, the adjustment value calculator 41 calculates adjustment values to be used to adjust the amount of attenuation of the power of the optical signal in each of the sub-channels transmitted by the transmitting device 10 so as to ensure that deviations of the power of the optical signals between the sub-channels are reduced in the receiving device 30. The adjustment value calculator 41 uses the following Equation (5) to calculate an adjustment value ΔVOA(i) that is used to adjust the amount of attenuation and is set for each sub-channel in the transmitting device 10. The adjustment value ΔVOA(i) represents an adjustment value that is set for the power of the optical signal of the i-th sub-channel and is used to adjust the amount of attenuation of the power of the optical signal.

ice information 422, an OCM_ID 423, and OCM information 424 are stored in association with a device ID 421 that identifies the transmitting device 10 or the receiving device $$\Delta VOA(i) = \frac{AveLoss - Loss(i)}{2} \quad (5)$$

Loss(i) is calculated using the following Equation (6).

$$Loss(i) = P_{add}(i) - P_{drop}(i) \quad (6)$$

In addition, AveLoss used in the aforementioned Equation (5) is calculated using the following Equation (7), for example.

$$AveLoss = 10\log\left(\frac{1}{N}\Sigma_{i=1}^{N}10^{Loss(i)/10}\right) \quad (7)$$

Then, the adjustment value calculator 41 transmits, to the transmitting device 10 through the communication line, the calculated adjustment value ΔVOA(i) to be used to adjust the amount of attenuation of the power of the optical signal of each of the sub-channels. The controller 14 of the transmitting device 10 transmits the received adjustment values for the sub-channels to the VOAs 12 configured to adjust the amounts of the attenuation of the power of the optical signals of the sub-channels each. The VOA 12 applies the received adjustment value ΔVOA(i) to be used to adjust the amount of the attenuation to the current amount of attenuation of the power of the optical signal of the sub-channels i. Thus, transmission power Padd(i, after) after the adjustment of the sub-channel i is expressed by the following Equation (8).

$$P_{add}(i, after) = P_{add}(i) - \Delta VOA(i) \quad (8)$$

Figure 10:
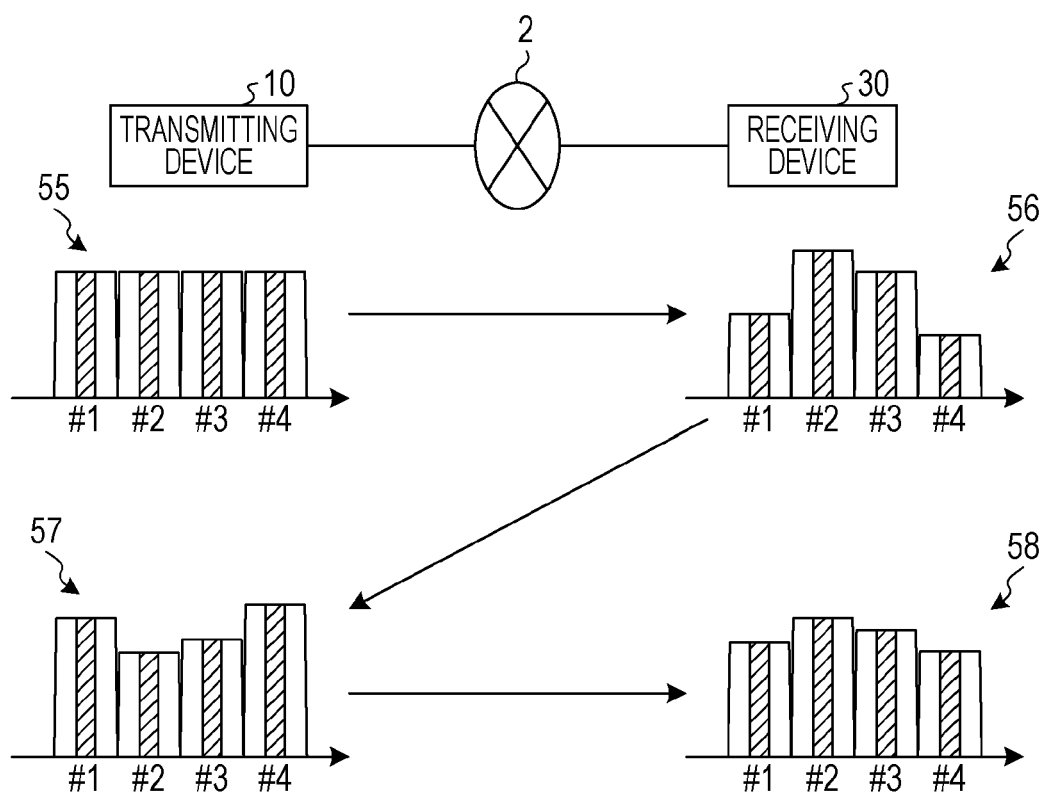
FIG. 10 is an explanatory diagram illustrating an example of a process of the adjustment of amounts of attenuation.

A process of the adjustment of the amounts of attenuation by the transmitting device 10 is described below with reference to FIG. 10. FIG. 10 is an explanatory diagram illustrating an example of the process of the adjustment of the amounts of attenuation. During the time when the optical signals transmitted by the transmitting device 10 are transferred through the optical communication network 2, the optical signals are attenuated due to a loss of the optical fiber cable forming the optical communication network 2, an induced Raman scattering effect, or the like. The amounts of the attenuation may vary depending on the wavelengths of the optical signals in general. In addition, an optical amplifier and an optical filter that are installed in the optical communication network 2 have dependency on wavelengths. When the optical amplifier and the optical filter relay the optical signals, deviations of the power occurs for the wavelengths.

For example, even when optical signals that have power of which deviations between sub-channels are small are transmitted by the transmitting device 10 as indicated by reference numeral 55 in FIG. 10, the deviations of the power between the sub-channels may increase upon the reception of the optical signals by the receiving device 30 through the optical communication network 2, as indicated by reference numeral 56. The deviations of the power that are indicated by reference numeral 56 may reduce the quality, for example a bit error rate, of an optical signal of a low-power sub-channel. In this case, the quality of optical signals in the super-channel including the plurality of sub-channels may be reduced.

The control device 40 according to the present embodiment causes an OCM 20 installed on the side of a transmission terminal of the transmitting device 10 to measure transmission power Padd(i) for each sub-channel and causes an OCM 20 installed on the side of a reception terminal of the receiving device 30 to measure reception power Pdrop(i) for each sub-channel. Then, the control device 40 uses the aforementioned Equation (6) to calculate, as Loss(i), difference between the transmission power Padd(i) and the reception power Pdrop(i) for the each sub-channel. Then, the control device 40 uses the aforementioned Equation (7) to calculate the average AveLoss of the differences Loss(i).

Then, the control device 40 uses the aforementioned Equation (5) to calculate, as an adjustment value $\Delta$VOA(i), one-half of the difference between the average AveLoss and the differences Loss(i) for the each sub-channel. Then, the control device 40 instructs the transmitting device 10 to add the adjustment value $\Delta$VOA(i) calculated for the each sub-channel to the current transmission power Padd(i). Thus, the power of the optical signals transmitted by the transmitting device 10 in the sub-channels is power indicated by reference numeral 57 in FIG. 10, for example.

Thus, the control device 40 may reduce the deviations of the power of the optical signals transmitted by the transmitting device 10 in the sub-channels, as indicated by reference numeral 58 in FIG. 10, for example. It is, therefore, possible to suppress reductions in the quality of the optical signals of the sub-channels and suppress reductions in the quality of optical signals in overall the super-channels.

Operation of Control Device 40

Figure 11:
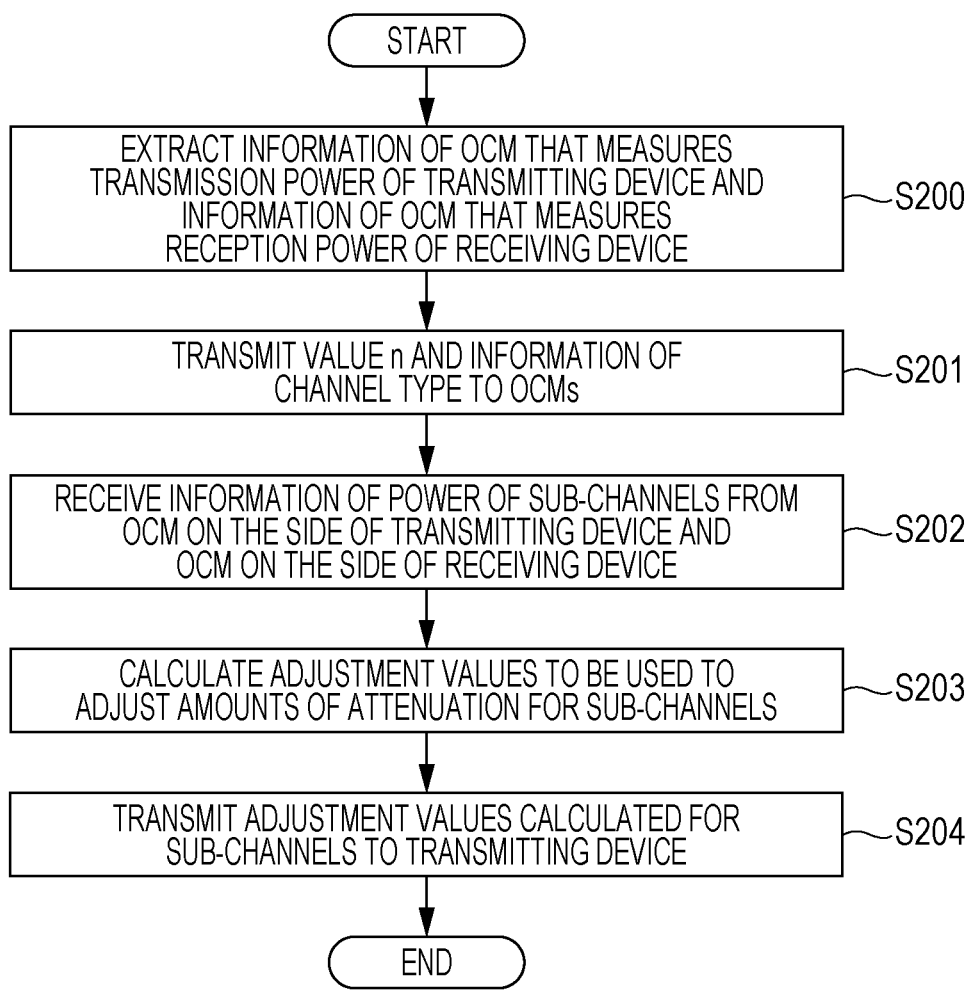
FIG. 11 is a flowchart of an example of an operation of the control device according to the second embodiment.

FIG. 11 is a flowchart of an example of an operation of the control device 40 according to the second embodiment. For example, when the receiver 44 receives the value n of the super-channel, the channel type of the super-channel, the device ID of the transmitting device 10, and the device ID of the receiving device 30 from the user of the control device 40, the control device 40 starts an operation depicted in the flowchart.

First, the receiver 44 transmits the received value n, the received channel type, the received device ID of the transmitting device 10, and the received device ID of the receiving device 30 to the adjustment value calculator 41 and the measurement instructor 43. The measurement instructor 43 references the device information table 420 within the holder 42 and extracts OCM information corresponding to the device ID, received from the receiver 44, of the transmitting device 10 and OCM information corresponding to the device ID, received from the receiver 44, of the receiving device 30 (in S200). Then, the measurement instructor 43 transmits the value n and information of the channel type received from the receiver 44 to OCMs 20 corresponding to the extracted OCM information through the communication line (in S201).

Next, the adjustment value calculator 41 references the device information table 420 within the holder 42 and extracts device information and the OCM information that are associated with the device IDs received from the receiver 44. Then, the measurement instructor 43 receives information of the power of the each sub-channel from the OCM 20 installed on the side of the transmitting device 10 and the OCM 20 installed on the side of the receiving device 30 (in S202).

Next, the adjustment value calculator 41 uses the aforementioned Equations (5) to (7) to calculate adjustment values to be used to adjust the amounts of attenuation of the power of the optical signals of the sub-channels (in S203). Then, the adjustment value calculator 41 transmits the calculated adjustment values for the sub-channels to the transmitting device 10 through the communication line (in S204), and the control device 40 terminates the operation depicted in the flowchart.

Effect of Second Embodiment

As described above, the control device 40 according to the second embodiment may suppress deviations of reception power between the sub-channels in the receiving device 30. Thus, the quality of the optical signals received by the receiving device 30 may be improved.

Modified Example

The techniques disclosed herein are not limited to the aforementioned embodiments and may be variously modified within the scope of the gist of the disclosure.

In the aforementioned first embodiment, the OCM 20 detects, based on the power measured in the narrower band than the sub-channels for each sub-channel, a sub-channel in which the power that is not in the allowable range is transmitted. The techniques disclosed herein, however, are not limited to this.

For example, the controller 25 of the OCM 20 calculates a power density per unit frequency based on the bandwidth of the passband of the BPF 21 and the power calculated by the spectrum analyzer 24. Since the bandwidths of the sub-channels are known, the controller 25 may multiply the bandwidths of the sub-channels by the calculated power density and estimate the total power of the each sub-channel. Then, the controller 25 may determine, based on the estimated total power of the each sub-channel, whether or not a sub-channel in which abnormal power is transmitted exists. Thus, even when the number of sub-channels in which normal power is transmitted among the plurality of sub-channels is smaller than the number of sub-channels in which abnormal power is transmitted among the plurality of sub-channels, the sub-channels in which abnormal power is transmitted may be detected.

In the aforementioned first or second embodiment, the controller 25 of the OCM 20 references the channel table 280 within the holder 28 and calculates the design values of the central frequencies $f_1$ to $f_n$ of the sub-channels included in the super-channel. The techniques disclosed herein, however, are not limited to this. The controller 25 may execute predetermined calculation to calculate the design values of the central frequencies $f_1$ to $f_n$ of the sub-channels included in the super-channel based on the central frequency $f_0$ and channel type of the super-channel. In this case, the holder 28 that includes the channel table 280 may not be provided in the OCM 20.

Hardware Configuration of OCM 20

Figure 12:
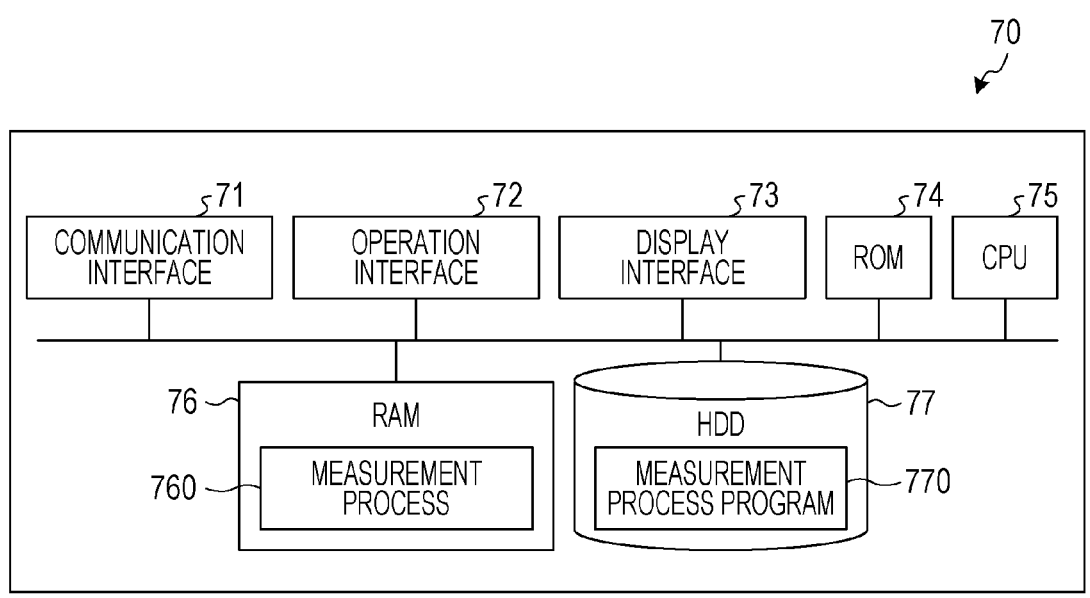
FIG. 12 is a diagram illustrating an example of a computer that achieves functions of an OCM.

The various processes described in the embodiments may be achieved by causing a computer to execute a prepared program. An example of the computer that executes the program having the same functions as the embodiments is described below. FIG. 12 is a diagram illustrating an example of a computer 70 that achieves the functions of the OCM 20.

Referring to FIG. 12, the computer 70 that achieves the functions of the OCM 20 includes a communication interface 71, an operation interface 72, a display interface 73, a ROM 74, a CPU 75, a RAM 76, and an HDD 77.

The HDD 77 includes a measurement process program 770 stored previously therein, as illustrated in FIG. 12, for example. The CPU 75 reads the measurement process program 770 from the HDD 77 and loads the read program into the RAM 76. The measurement process program 770 may be integrated or separated in the same manner as the constituent elements illustrated in FIG. 1 or 7. In addition, all data do not need to be always stored in the HDD 77, and it is sufficient when data to be used for the processes is stored in the HDD 77.

The CPU 75 causes the measurement process program 770 to function as a measurement process 760. The measurement process 760 causes various types of data read from the HDD 77 to be loaded into a region allocated on the RAM 76 and causes the various processes to be executed based on the loaded data.

In the OCM 20 according to the aforementioned first embodiment, the CPU 75 reads and executes the measurement process program 770 and thereby achieves the same functions as the BPF 21, the photodiode 22, the ADC 23, the spectrum analyzer 24, the controller 25, the receiver 26, the output unit 27, and the holder 28.

In each of the OCMs 20 according to the aforementioned second embodiment, the CPU 75 reads and executes the measurement process program 770 and thereby achieves the same functions as the BPF 21, the photodiode 22, the ADC 23, the spectrum analyzer 24, the controller 25, the holder 28, and the communication unit 29.

The measurement process 760 according to the aforementioned first embodiment executes the processes that are executed by the OCM 20 illustrated in FIG. 1 or executes the processes illustrated in FIG. 6. All the processing units that are virtually achieved by the CPU 75 may not be achieved by the CPU 75, and it is sufficient when the processing units to be used for the processes are virtually achieved by the CPU 75.

The aforementioned measurement process program 770 may not be stored in the HDD 77 or the ROM 74. For example, programs may be stored in portable storage media such as a flexible disk to be inserted in the computer 70 or a so-called FD, a CD-ROM, a DVD, a magnetic optical disc, and an IC card. Then, the computer 70 may acquire the programs from the portable storage media and execute the programs. Alternatively, the computer 70 may acquire the programs from another computer or server storing the programs through a public line, the Internet, a LAN, a WAN, or the like and execute the programs.

All examples and conditional language recited herein are intended for pedagogical purposes to aid the reader in understanding the invention and the concepts contributed by the inventor to furthering the art, and are to be construed as being without limitation to such specifically recited examples and conditions, nor does the organization of such examples in the specification relate to a showing of the superiority and inferiority of the invention. Although the embodiments of the present invention have been described in detail, it should be understood that the various changes, substitutions, and alterations could be made hereto without departing from the spirit and scope of the invention.

What is claimed is:

1. A measuring device comprising:
    an identifying unit configured to identify a design value of a central frequency of spectrum of an optical signal for each of sub-channels, the optical signal being formed in Nyquist pulse, the sub-channels forming a super-channel in wavelength division multiplexing communication; and
    a measurer configured to measure the power of the optical signal in a band for each of the sub-channels, the identified design value of the central frequency of the band being a central frequency of the band, the band being narrower than a frequency band of a corresponding one of the sub-channels.

2. The measuring device according to claim 1, further comprising
    an output unit configured to output, based on the power of the optical signals measured by the measurer for the sub-channels, information of a sub-channel of which the power is different from average power of the optical signals of the sub-channels by a value that is not in a predetermined range.

3. The measuring device according to claim 1, further comprising:
    a holder configured to hold offset value of the central frequency of each of the sub-channels from a central frequency of the super-channel, the offset value being associated with channel type identifying configuration of the super-channel; and
    a receiver configured to receive an instruction for specifying the channel type,
    wherein the identifying unit
    extracts, from the holder, the offset value of the central frequency of each of the sub-channels, the sub-channels being included in the super-channel corresponding to the channel type received by the receiver, and
    identifies, as the design value of the central frequency of spectra of the optical signal formed in the Nyquist pulse, frequency offset by frequency corresponding to the extracted offset value from the central frequency of the super-channel.

4. The measuring device according to any of claim 1, wherein the measurer measures the power of the optical signal in the band in which the design value of the central frequency of each of the sub-channels is the center of the band and of which bandwidth is equal to or wider than ⅙ of bandwidth of frequency band of corresponding one of the sub-channels and equal to or narrower than ⅕ of the bandwidth of the frequency band of the corresponding one of the sub-channels, the design value being identified by the identifying unit.

5. A measurement method for causing a computer to execute a process, the process comprising:
    identifying design values of the central frequencies of spectra of optical signals formed in Nyquist pulses for sub-channels, the sub-channels forming a super-channel; and
    measuring, for the sub-channels, the power of the optical signals in bands in which the identified design values of the central frequencies are the centers of the bands and that are narrower than frequency bands of the sub-channels.

6. A transmission system comprising:
    a control device;

a first measuring device configured to measure the power of optical signals transmitted by a transmitting communication device for sub-channels forming a super-channel in wavelength division multiplexing communication; and a second measuring device configured to measure the power of the optical signals to be received by a receiving communication device for the sub-channels, wherein the first measuring device and the second measuring device each include an identifying unit configured to identify design values of the central frequencies of spectra of the optical signals formed in Nyquist pulses for the sub-channels, a measurer configured to measure, for the sub-channels, the power of the optical signals in bands in which the identified design values of the central frequencies are the centers of the bands and that are narrower than frequency bands of the sub-channels, and wherein the control device includes a measurement instructor configured to instruct the first measuring device and the second measuring device to measure the power of optical signals of the sub-channels, and an adjustment value calculator configured to calculate, based on results of the measurement by the first measuring device and results of the measurement by the second measuring device, adjustment values to be used to adjust the amounts of attenuation of the optical signals, transmitted by the transmitting communication device, of the sub-channels so as to reduce deviations of the power of the optical signals between the sub-channels in the receiving communication device and configured to transmit the calculated adjustment values to the transmitting communication device.

* * * * *